3,167,374
PROTECTIVE COVER WITH CORD SEALING MEANS FOR ELECTRICAL WIRING DEVICES

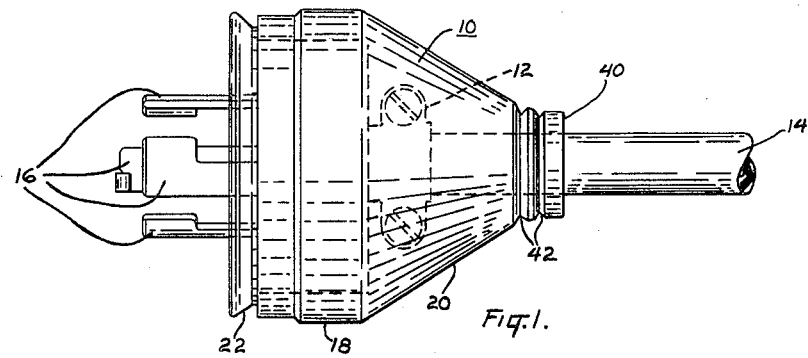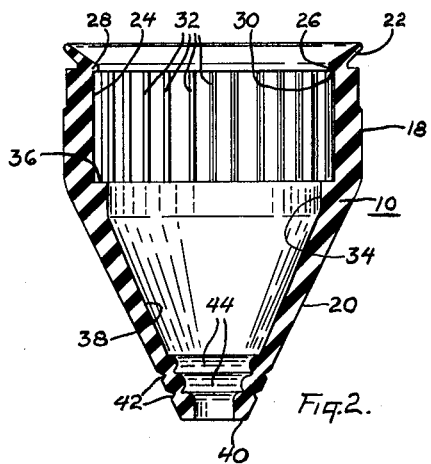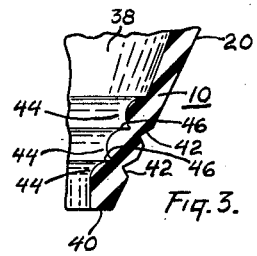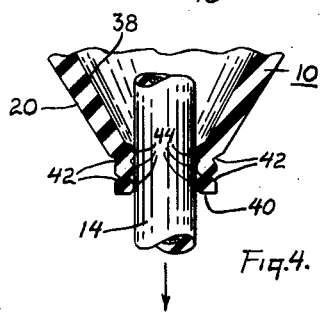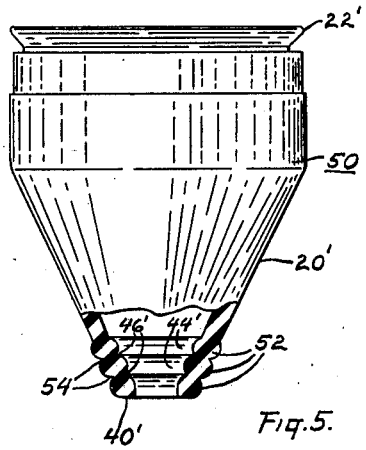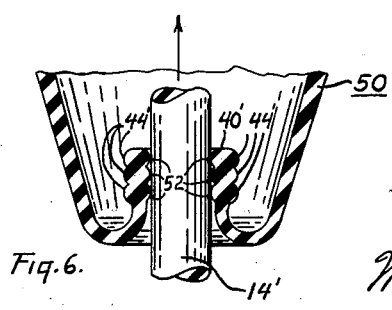

Joseph F. Healy, Westport, Conn., assignor to Harvey Hubbell, Incorporated, Bridgeport, Conn., a corporation of Connecticut
Filed Sept. 20, 1961, Ser. No. 139,406
5 Claims. (Cl. 339—60)

This invention relates to protective covers for electrical wiring devices, particularly electrical cord connectors.

There are many detachable electrical wiring devices, such as electrical cord connectors, that are frequently used with flexible, heavy, resiliently sheathed electrical cords which are used in industrial, marine, trailer and garage areas to permit selective connection and disconnection of the cords, wherein the cords are subjected to water, moisture, metal filings, dust, dirt, lint and rough physical usage, including being knocked against hard floors and objects. In such environments, conventional electrical cord connectors are inadequate in that they are unable to withstand such severe conditions, and are subject to malfunctioning and destruction if exposed to such severe conditions, as by having their metallic elements corroded, having their contacts shorted out, having their usual brittle insulating bodies cracked, and by having other physical or functional breakdowns.

The art has treated this problem by providing protective coverings for electrical cord connectors. In Patent No. 2,127,544, of C. T. Von Holtz, dated August 23, 1938, entitled Waterproof Rubber Covering for Cord Connectors, there is disclosed a waterproof rubber covering for an electrical cord connector of the general type to which my invention relates. In that patent a rubber covering is disclosed comprising two rubber covers which are individually mounted on two connector components and arranged to become operative on connection of the connector components in the usual manner to effect a seal to render the connector waterproof.

In a copending application of Paul E. Degnan and myself, Serial No. 90,822, filed February 21, 1961, now Patent No. 3,120,987, dated February 11, 1964, and assigned to the assignee of the instant application, there is disclosed an improvement on the invention of the Von Holtz patent relating principally to the interengaging sealing portions of the Von Holtz protective coverings. It is the purpose of the instant invention to improve the portions of the protective coverings in the Von Holtz patent and in the copending application, which engage the usual electrical cord that is wired to the connector component on which the protective covering is mounted.

It has been found in practice that when utilizing the protective coverings of the Von Holtz patent or the copending application, it was desirable to taper or thin down portions of their protective coverings which engage and make sealing contact with the electrical cord in order to provide an effective seal thereat. This tapering was necessary to initially permit mounting of the cover and thereafter to effect a seal, because the contact between the prior art cord-engaging cover portion and the electrical cord was continuous surface contact. In tapering the cord-engaging portion, it was necessarily weakened and frequently split during its mounting on an electrical cord or thereafter when placed in service. This was particularly likely to occur because of the difficulty of dilating the cord-engaging portion and forcing it over the electrical cord during its mounting. Furthermore, when placed in service and subjected to the usual pulling on the electrical cord which occurs, the cord-engaging portion of the prior art protective covers frequently separated from the electrical cord and formed a gap, thereby breaking the seal, particularly when the cord was moved sideways relative to its connector component and protective covering. Further still, with the prior art type of protective covering, wherein the cord-engaging portion was substantially cylindrical, though slightly tapered to effect the seal, it was suitable substantially only for a single diameter cord, and therefore, it was necessary for suppliers to stock a variety of coverings having different sized diameter cord-engaging portions.

It is an object of the invention to provide an improved protective covering for an electrical wiring device of the type having an electrical cord, which includes an improved cord-engaging portion: which is relatively easy to mount on the cord; which is substantially free of the danger of splitting during mounting or when placed in service; which is operationally superior in that it maintains an effective seal on the electrical cord during service, and which is suitable for use with a variety of different sized diameter electrical cords.

Other objects and further details of that which I believe to be novel and my invention will be clear from the following description and claims taken with the accompanying drawing, wherein:

FIG. 1 is a side elevational view of a protective cover embodying the invention mounted on a wiring device having a resiliently sheathed electrical cord connected thereto;

FIG. 2 is a longitudinal sectional view taken through the protective cover of FIG. 1 shown by itself;

FIG. 3 is an enlarged portion of FIG. 2;

FIG. 4 is a fragmentary sectional view of the cord-engaging portion of a protective cover embodying the invention illustrated when finally mounted on an electrical cord;

FIG. 5 is a side elevational view with portions broken away and shown in section for clarity of a modified form of protective cover, and FIG. 6 is a longitudinal sectional view of the cord-engaging portion of the FIG. 5 cover illustrated in an intermediate condition during its mounting on an electrical cord.

In the drawings, two modifications of the invention are illustrated and in each instance only a single protective cover is illustrated. By reference to the Von Holtz patent and the copending application, the manner in which two protective covers of the general type herein involved are utilized with two electrical cord connector components will be understood. It is intended that the principal application of the instant invention will be as a pair of protective covers with two such electrical cord connector components; however, the invention also has utility when only a single protective cover is employed, for example, when it is mounted on a connector cap and operationally associated with a wall-mounted electrical receptacle or the like to effect a seal between the cap and receptacle. Therefore, though only a single protective cover is illustrated in the drawing, it should be clearly understood that they may be used alone or in pairs, as illustrated in the Von Holtz patent and the copending application.

In FIGS. 1–4, one form of the improved protective cover is illustrated and designated generally by reference numeral 10. Cover 10 is illustrated in FIG. 1 as mounted on an electrical cord connector component 12 and on a resiliently sheathed, cord section 14 that is wired in any conventional manner to the connector component. In FIG. 1, the electrical cord connector component 12 is illustrated as being in the form of a connector cap having a plurality of projecting male electrical contact blades 16 of the known interlocking type, one of which is distinctively formed as a grounding blade, a practice which is known in the art.

With reference to FIG. 2, cover 10 may be seen by itself in its free state and its construction clearly understood. Protective cover 10 comprises a hollow, unitary body made of a tough, but resilient, material such as a relatively heavy, live rubber, which may be natural or synthetic. On its exterior the cover 10 comprises a generally cylindrical surface portion 18, a rearwardly and uniformly radially inwardly tapered, conical surface portion 20, and a sealing portion 22 in the form of an inclined axially forwardly and radially outwardly extending, flange-like, flexible lip. In the drawing, with reference to FIG. 1, the left-hand side of the cover 10 is being referred to as the front or forward end and the right-hand side as the rear thereof. On the interior, the cover 10 has an axially extending annular groove 24 formed which is disposed generally within cylindrical portion 18 and which cooperates with sealing lip 22, which has a central opening 26 of lesser diameter than that of the groove 24 which forms a radially inwardly extending rib 28 having a flat annular radial rearwardly facing shoulder 30. The groove 24 forms a radially inwardly facing cylindrical wall that has a plurality of circumferentially spaced axially extending ridges 32 formed thereon to grip the body of a connector component when the cover is mounted on one. Adjacent to the groove 24 at its rearward side is a cylindrical wall 34 of lesser diameter and axial extent and which cooperates therewith to form a flat annular radial forwardly facing shoulder 36. Wall 34 at its rearward side merges with a rearwardly and radially inwardly tapered conical wall 38. The body of the connector component on which cover 10 is mounted is disposed within groove 24 and axially positioned by and between shoulders 30 and 36.

The construction of the cover 10 as explained thus far corresponds generally to that of the cord connector cap cover of either the Von Holtz patent or the copending application, and it is mounted on a connector cap and functions in a generally similar manner to be retained thereon and to effect a seal with a cooperating covered electrical cord connector body or a suitable receptacle, when operatively associated therewith, the sealing lip 22 being deformed and biased into sealing contact with a portion of the associated element in the known manner.

The invention herein is primarily concerned with the provision of an improved cord-engaging portion on the rearward ends of protective covers of the types disclosed in the Von Holtz patent or the copending application. As will be clearly seen in FIGS. 2 and 3, when cover 10 is in its free state, the tapered surface portion 20 tapers uniformly to the rear end formed by flat annular rear edge wall 40. A pair of spaced, radially outwardly facing, V-cross-sectioned grooves 42 are formed in the portion 20 spaced from and immediately adjacent the edge wall 40. On the interior of the cover 10 immediately adjacent the rear edge wall 40, the wall 38 has formed thereon a plurality of spaced, transverse, annular, radially inwardly extending ribs 44.

When the cover 10 is mounted on an electrical wiring device, its cord-engaging portion cooperates with the electrical cord 14 to effect a vastly improved seal for the cord. As can be seen in FIG. 4, when the cover is mounted on cord 14, the rear part of the cover 10 is deformed radially outwardly and is resiliently biased radially inwardly, as a result of its inherent strain-relieving tendency, against the periphery of the resilient covering on the cord 14 into firm sealing contact therewith. As illustrated in FIG. 4, there are in fact three, separate, annular seals formed between the peaks of the ribs 44 and the resilient cord covering. In this regard, each rib 44 functions as a sealing O-ring. To mount the cover 10 on the cord 14, an end of the cord (the lower one in FIG. 4) is inserted through the front of the cover, moved rearwardly relative thereto in the direction of the schematic arrow in FIG. 4, the constricted rear part of the cover 10 is forcibly dilated and the end of the cord is forced therethrough, and the end of the cord is then pulled through the cover the desired amount. Ordinarily, the end of the cord that is to be wired to a device to be electrically powered is inserted through the cover first. Therefore, in FIG. 4, the lower end is wired to a device to be powered and the upper end is wired to a connector component. During such installation with prior art covers, the cord-engaging portions of the prior art covers have been prone to split as a result of the dilating stresses encountered. The ribs 44 of applicant's improved cover eliminate such splits by structurally strengthening the cord-engaging portion and minimizing the friction between the cord-engaging portion of the cover and the cord, as only the peaks of the ribs contact the periphery of the cord sheathing, thereby reducing the total area of frictional contact and lessening the mount of force required to pull the cover over the cord to its final position. Thereafter, the ribs 44 perform the function of constantly engaging the periphery of the cord sheathing in sealing contact therewith, as set forth above, and it has been found in practice that after a short period of use of an improved cover on a cord having a resilient sheath, each of the ribs 44 impresses a permanent indentation in the cord sheath, and this, of course, is an excellent indication of the effective sealing association effected.

In FIGS. 1–4 there have been illustrated three ribs 44; however, any desirable number may be utilized, such as four, five or more. In connection with this structural feature, the improved cover provides an additional practical advantage of being "multi-size," i.e., capable of being used with a variety of different sized diameter cords. In order to utilize the cover 10 illustrated in FIG. 2 with an electrical cord of a significantly larger diameter than that of cord 14, and assuming, for example, that the rearwardmost rib 44 would obstruct the cord and prevent it from passing over such a large diameter cord, it is only necessary to remove the rearwardmost rib 44 by physically severing it off the cover 10. In view of the facts that it is desirable to sever a rib at a valley formed between two adjacent ribs, the valleys being designated 46, and in the absence of the external grooves 42 it would not be possible to know where such a valley was located, the external grooves 42 are provided as cutting marks or guides. It will be observed, particularly in FIG. 3, that the grooves 42 are substantially radially aligned with the valleys 46. The external grooves 42 have proved in practice to be extremely well suited for use as guides; however, if desired, small external annular ribs may be employed as cutting marks in place of the grooves. It will be apparent that after removal of the rearwardmost rib 44 a larger diameter cord may be accommodated as the internal diameter of the then remaining rearwardmost rib is larger than that of the original rearwardmost rib which was removed. Therefore, a single, unitary cover 10 may be manufactured, as by molding, which is adaptable for use with a variety of different sized cords. This avoids the necessity of suppliers stocking plural sized covers as was necessary with the prior art devices.

In FIGS. 5 and 6, there is illustrated a modified form of protective cover which is particularly well suited for use with a connector component having an extremely long electrical cord connected to it, such as a length of twenty-five, fifty or one hundred feet, which lengths are frequently encountered in industry. In FIGS. 5 and 6 there is illustrated a modified protective cover 50 which is the same as the FIGS. 1–4 form of cover in all respects other than that it has added to it a plurality of radially outwardly extending ribs 52 formed on the exterior of its terminal rear portion and does not have grooves 42, as such, formed in it. Parts in both forms which are similar will be designated by the same reference numeral with a prime (') added in describing the cover 50.

As can be seen in FIG. 5, there is an annular external valley 54 formed between a pair of adjacent ribs 52 and each valley is substantially radially aligned with an internal valley 46' formed between a pair of adjacent internal ribs 44'. Therefore, valleys 54 function as cutting marks or grooves in the same manner as grooves 42 of the first form. The provision of external ribs 52 renders the utilization of the cover 50 with an extremely long electrical cord feasible. In order to appreciate this fact, however, the manner in which the FIGS. 1-4 form of cover was described as being mounted on the electrical cord 14 should be kept in mind. It will be recalled that in FIG. 4, the lower end of the electrical cord 14 was described as being inserted through the front of the cover 10 and forced rearwardly relatively thereto in the direction of the schematic arrow. In the FIG. 4 arrangement, ordinarily the connector component is wired to the upper end (not shown) of the cord 14, and the other end of the cord, which is usually wired to the device being electrically powered, is inserted and then pulled through the cover. If the electrical cord 14 is extremely long, this mounting procedure would require that the cover be pulled over the cord the entire length of the cord until the cover is adjacent the upper end of the cord to which the cord connector is to be wired. This obviously is undesirable for it would be labor wasting and subject the cover to undue stress.

The provision of the external ribs 52 permits the cover 50 to be mounted on an extremely long electrical cord without requiring that it be pulled over its entire length. As can best be seen in FIG. 6, this is accomplished by first inverting the cord-engaging portion of the cover 50 so as to temporarily dispose the external ribs 52 on the interior of the cover so as to extend radially inwardly. Then the upper end of the cord 14', which is to be wired to the electrical connector component, is inserted and forced through the inverted cord-engaging portion of the cover 50 and pulled in the direction of the schematic arrow in FIG. 6. During insertion of the cord 14' the ribs 52 contact the periphery of the cord sheath only at their peaks, and therefore, reduce the amount of friction necessary to mount the inverted cord-engaging portion on the cord. After a moderately small, but sufficient, amount of the cord 14' has been pulled upwardly through the inverted cord-engaging portion of the cover 50, it may be connected to the electrical connector component; the cord-engaging portion is restored to its original non-inverted position with the external ribs 52 disposed on the exterior of the cover and the ribs 44' extending radially inwardly into sealing contact with the periphery of the cord sheath. When the cover 50 is fully mounted on the cord 14' in finally assembled condition, its cord-engaging portion is disposed relative thereto to form an effective seal therewith in substantially the same manner as the cover 10 is disposed on the cord 14 and forms a seal therewith, as shown in FIG. 4. It will, therefore, be apparent that the external ribs 52 primarily perform the function of facilitating mounting of the cover 50 on a long cord. They also perform the function of having the valleys 54 formed between them function as a mark or guide as to where a cut should be made when it is desired to remove an internal rib to accommodate a larger size cord.

As will be evident from the foregoing description, certain aspects of my invention are not limited to the particular details of construction of the examples illustrated, and I contemplate that various and other modifications and applications will occur to those skilled in the art.

For example, though I have illustrated and described both forms of my improved protective covers as mounted on resiliently sheathed electrical cords, which is the preferred arrangement wherein maximum benefits are achieved, the covers will also be effective when used in association with non-resiliently sheathed electrical cord.

It is, therefore, my intention that the appended claims shall cover such modifications and applications as do not depart from the true spirit and scope of my invention.

Having thus set forth the nature of my invention, I claim:

1. A protective cover adapted to be mounted on an electrical connector component having an electrical cord wired to it comprising a resilient unitary body having: a portion for surrounding and gripping the connector component; sealing means at one end of the body arranged to be disposed where the front face of the connector component on which it is adapted to be mounted is disposed when it is mounted on the connector component; and a cord-engaging portion at the other end of the body for receiving and snugly embracing the electrical cord in sealing contact comprising a generally uniformly tapered cylindrical portion terminating in a reduced rearward open end and having a plurality of transverse radially inwardly extending ribs formed on its interior adjacent the open end, an annular valley formed between each pair of adjacent ribs, and marks formed on the exterior of said tapered portion which are substantially radially aligned with said valleys, whereby one or more ribs may be removed from said cover by selectively cutting off the rearward portion of the body at said marks.

2. A protective cover as defined in claim 1 wherein said marks are formed by annular grooves formed in the exterior of said tapered portion.

3. A protective cover as defined in claim 1 wherein a plurality of transverse radially outwardly extending ribs are formed on said tapered portion adjacent the open end which project beyond the outer surface thereof.

4. A protective cover as defined in claim 3 wherein an annular valley is formed between pairs of adjacent ribs on both the interior and exterior of said tapered portion which are substantially radially aligned whereby one or more internal ribs may be removed from said cover by cutting a rearward portion of the body at said valleys.

5. In combination: a detachable electrical connector component; a resiliently sheathed electrical cord wired to said component; and a protective cover for said component comprising a portion for surrounding and gripping said component, sealing means at one end of the cover disposed where the front face of said component is disposed when said cover is mounted on said component, and a tapered cylindrical cord-engaging portion for receiving and snugly embracing said electrical cord in sealing contact at the other end of said cover, said tapered portion having a plurality of transverse radially inwardly extending ribs formed on its interior which are arranged to contact said electrical cord when said cover is mounted on said electrical cord, an annular valley formed between each pair of adjacent ribs, and marks formed on the exterior of said tapered portion which are substantially radially aligned with said valleys, whereby one or more ribs may be removed from said cover by selectively cutting off the rearward portion of the body at said marks.

References Cited in the file of this patent

UNITED STATES PATENTS

| | | |
|---|---|---|
| Re. 24,438 | Moorhead | June 21, 1954 |
| 2,127,544 | Von Holtz | Aug. 23, 1938 |
| 2,420,826 | Irrgang | May 20, 1947 |
| 2,694,798 | Cole | Nov. 16, 1954 |
| 2,774,048 | Baenziger | Dec. 11, 1956 |
| 2,800,526 | Moorhead | July 23, 1957 |
| 2,891,101 | Koliss | June 16, 1959 |
| 2,935,720 | Lorimer | May 3, 1960 |
| 3,112,975 | Hamel | Dec. 3, 1963 |